Jan. 31, 1928.
A. Y. DODGE
BRAKE SHOE
Original Filed April 17, 1925
1,657,884
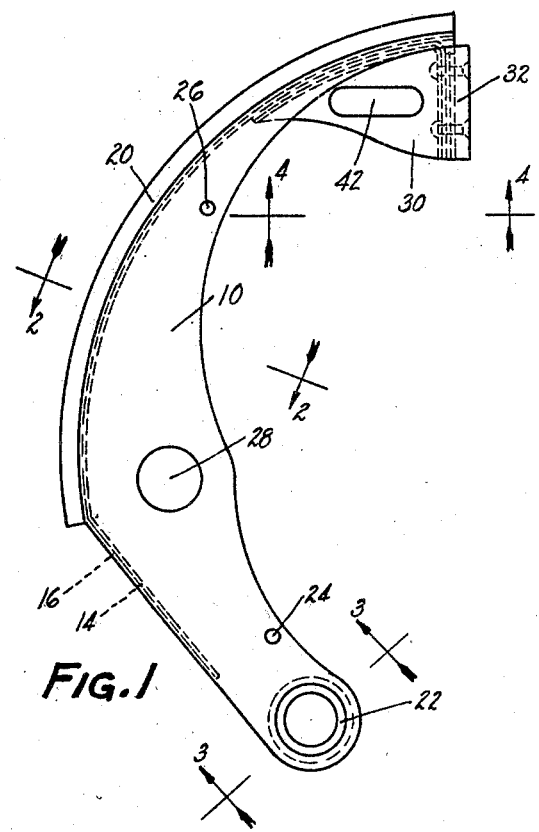
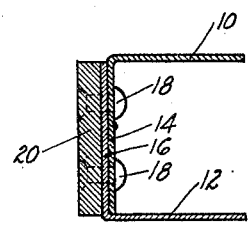
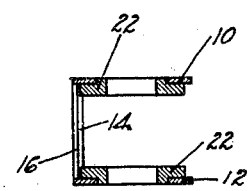
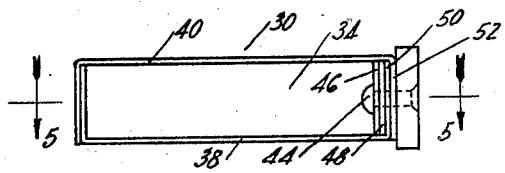
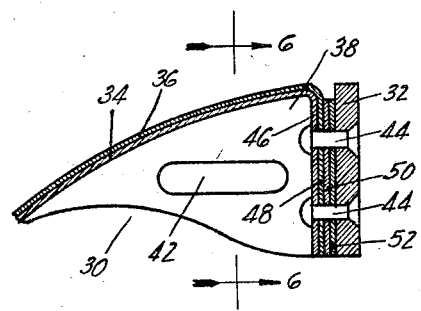
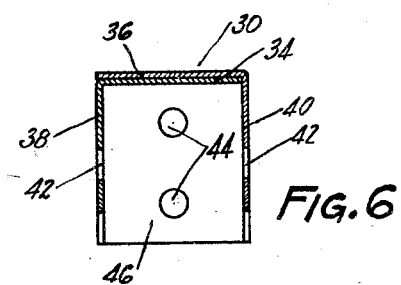
INVENTOR
ADIEL Y. DODGE
BY
M. W. McConkey
ATTORNEY Patented Jan. 31, 1928.

1,657,884

UNITED STATES PATENT OFFICE.

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS.

BRAKE SHOE.

Original application filed April 17, 1925, Serial No. 23,763. Divided and this application filed April 6, 1927. Serial No. 181,300.

This invention relates to brake shoes, and is illustrated as embodied in a shoe for an internal expanding automobile brake. An object of the invention is to provide a shoe built up of stampings, preferably in such a manner as to form a channel-section shoe.

In one desirable arrangement there are two sections L-shaped in cross-section arranged to face toward each other. Preferably the outer flanges of these sections are superposed, and advantage may be taken of this arrangement to secure the lining of the shoe with the rivets or other fastenings which fasten the sections together.

Other features of the invention relate to a novel bracket arranged at the end of the shoe and carrying a cam-engaging thrust plate.

The above and other objects and features of the invention, including various novel combinations of parts and desirable particular constructions, will be apparent from the following description of one illustrative embodiment shown in the accompanying drawing, in which:

Figure 1 is a side elevation of the novel shoe;

Figure 2 is a section through the shoe on the line 2—2 of Figure 1;

Figure 3 is a section through the end of the shoe, on the line 3—3 of Figure 1;

Figure 4 is a bottom plan view of the bracket for the thrust plate, looking in the direction of the arrows 4—4 in Figure 1;

Figure 5 is a section through the bracket on the line 5—5 of Figure 4; and

Figure 6 is a section through the bracket on the line 6—6 of Figure 5.

The shoe selected for illustration is built up from two sections or stampings, pressed from sheet steel, and including straight radial reinforcing portions or webs 10 and 12 at opposite sides of the shoe, and superposed generally-cylindrical circumferential flanges 14 and 16 secured together by rivets or other fastenings 18, which fastenings may also serve to attach brake lining 20.

Flanges 14 and 16 may extend a substantial distance beyond the end of the lining 20, to reinforce and stiffen portions of webs 10 and 12 which extend at the end of the shoe as projecting arms. At their ends these arms are provided with alined bushings 22, adapted to be mounted on a pivot. Flanges 10 and 12 may be formed with openings 24 and 26 for the attachment of return springs, and with an opening 28 for the anchor of an adjacent (secondary) shoe.

One advantage of the above-described construction is that, in forming the sections of the shoe by stamping or drawing from sheet steel, the flat webs 10 and 12 may bottom in the dies, and being flat have no tendency to spring back when released, while flanges 14 and 16 may be drawn along the side of the die, giving great accuracy.

At its upper end, the shoe is provided with a novel bracket 30, carrying a hardened cam-engaging thrust plate 32. This bracket is formed of two sections or stampings pressed from sheet metal, in the same general manner as the body of the shoe.

The sections of the bracket include superposed cylindrical or circumferential flanges 34 and 36, and side flanges 38 and 40 which are shown with elongated openings 42 for a post forming part of the brake-applying means.

The wear plate 32 is secured, by rivets 44 or the like, to four superposed flanges 46, 48, 50, and 52, which are folded inwardly respectively from flanges 34, 36, 38, and 40.

While one illustrative embodiment has been described in detail, it is not my intention to limit the scope of the invention to that particular embodiment, or otherwise than by the terms of the appended claims. This application is a division of my prior application No. 23,763, filed April 17, 1925.

I claim:

1. A channel-shaped brake shoe comprising two parts, each with a radial portion and a circumferential flange, the two circumferential flanges being superposed and the two radial portions forming the sides of the channel.

2. A channel-shaped brake shoe comprising two parts, each with a radial portion and a circumferential flange, the two circumferential flanges being superposed and the two radial portions forming the sides of the channel, brake lining covering the circumferential flanges, and rivets passing through the brake lining and through the flanges.

3. A channel-shaped brake shoe of pressed metal having portions bent over to form one or more radial parts across the end of the channel, and a cam plate secured to said parts.

4. A channel-shaped brake shoe of pressed metal having its sides bent inwardly to form radial parts across the end of the channel, and a cam plate secured to said parts.

5. A pressed metal shoe having a pressed metal bracket-shaped carrier secured to its end, and a cam plate secured to the carrier.

6. A pressed metal shoe having a pressed metal bracket-shaped carrier secured to its end and terminating in a radial surface, and a flat cam plate secured to the radial surface of the carrier.

7. A brake shoe comprising two angular sections arranged to face toward each other and having superposed portions which are secured together.

8. A brake shoe comprising two separate parts having superposed portions, brake lining overlying said portions, and fastenings passing through the lining and the superposed portions of said parts.

9. A brake shoe comprising two sections secured together and so formed as to provide at the end of the shoe spaced arms respectively integral with said sections, and having superposed reinforcing parts connecting said arms and also respectively integral with said sections.

In testimony whereof, I have hereunto signed my name.

ADIEL Y. DODGE.